United States Patent [19]

Merdan et al.

[11] Patent Number: 5,994,667
[45] Date of Patent: *Nov. 30, 1999

[54] METHOD AND APPARATUS FOR LASER CUTTING HOLLOW WORKPIECES

[75] Inventors: Kenneth M. Merdan, Maple Grove; Mark M. Wright, Plymouth; Vitaliy N. Shapovalov, New Hope; Matthew S. Shedlov, St. Michael, all of Minn.

[73] Assignee: SciMed Life Systems, Inc., Maple Grove, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/950,644

[22] Filed: Oct. 15, 1997

[51] Int. Cl.⁶ .................................................... B23K 26/00
[52] U.S. Cl. .................................... 219/121.67; 219/121.7
[58] Field of Search ........................... 219/121.6, 121.67, 219/121.7, 121.71, 121.84, 121.72, 121.82

[56] References Cited

U.S. PATENT DOCUMENTS

| | | |
|---|---|---|
| 1,812,409 | 6/1931 | Leckie . |
| 2,189,331 | 2/1940 | Sower . |
| 2,189,339 | 2/1940 | Black et al. . |
| 2,947,065 | 8/1960 | Moody et al. . |
| 3,612,814 | 10/1971 | Heraldcroft . |
| 4,002,877 | 1/1977 | Banas . |
| 4,188,413 | 2/1980 | Lupinski et al. ........................ 427/459 |
| 4,233,486 | 11/1980 | Inoue .................................... 219/69.12 |
| 4,288,680 | 9/1981 | Roder ................................... 219/121.67 |
| 4,324,972 | 4/1982 | Furrer et al. . |
| 4,403,134 | 9/1983 | Klingel . |
| 4,409,463 | 10/1983 | Duruz et al. . |
| 4,412,120 | 10/1983 | Duruz et al. . |
| 4,742,206 | 5/1988 | Dietterich et al. . |
| 4,833,764 | 5/1989 | Muller . |
| 4,893,972 | 1/1990 | Blaho . |
| 4,931,615 | 6/1990 | Muncy et al. . |
| 4,950,861 | 8/1990 | Erlenmaier et al. . |
| 4,980,534 | 12/1990 | Okamoto et al. . |
| 4,998,206 | 3/1991 | Jones et al. . |
| 5,073,694 | 12/1991 | Tessier et al. . |

FOREIGN PATENT DOCUMENTS

| | | |
|---|---|---|
| 0 714 641 A2 | 11/1994 | European Pat. Off. . |
| 254543 | 3/1988 | Germany ........................... 219/121.72 |
| 57-50295 | 3/1982 | Japan . |
| 57-177896 | 11/1982 | Japan . |
| 59-66032 | 4/1984 | Japan ................................. 219/121.71 |
| 60-49884 | 3/1985 | Japan ................................. 219/121.72 |
| 60-166184 | 8/1985 | Japan . |
| 61-169188 | 7/1986 | Japan ................................. 219/121.84 |
| 62-181833 | 8/1987 | Japan . |
| 63-190195 | 8/1988 | Japan . |
| 1-228695 | 9/1989 | Japan . |
| 4-158996 | 6/1992 | Japan . |
| 4-262888 | 9/1992 | Japan . |
| 4-262889 | 9/1992 | Japan . |
| 7-241689 | 9/1995 | Japan . |
| WO 89/03274 | 4/1989 | WIPO . |

*Primary Examiner*—Gregory Mills
*Attorney, Agent, or Firm*—Crompton, Seager & Tufte, LLC

[57] ABSTRACT

Devices and methods for preventing laser burn through in cutting tubes. In laser cutting of tubes, the laser strikes one side of the tube at a point of illumination, eventually burning through the first side, and can continue burning partially or completely through on the opposite side. Material burned away on the first side can sputter as molten metal onto the interior of the tube as well. One device runs a continuous inner metal wire through a tubular workpiece while the tube is being cut by laser, thereby occluding any laser beam cutting through the first side. The continuous metal wire can also serve to adhere dross to the wire instead of to the tube interior. The wire is preferably moved longitudinally and rotationally during burning, thereby presenting a continually differing portion of wire to the laser beam. Moving the wire can remove adhered dross and prevent melting of the wire by the laser.

18 Claims, 2 Drawing Sheets

METHOD AND APPARATUS FOR LASER CUTTING HOLLOW WORKPIECES

The present invention is related to a device for laser cutting of tubes. More specifically, the present invention relates to a device and method for preventing laser burn through of the opposite tube wall including pulling a wire through the tube during laser cutting.

BACKGROUND OF THE INVENTION

Laser cutting provides a precise method for machining intricate and small patterns in pieces of metal, polymer, and other materials. A particular application of interest is the machining of metallic tubes for use as intravascular stents. The stents are designed to be inserted into the vasculature, including the coronary arteries. Stents usually include open spaces in the tube walls to provide vessel support with minimal intimal contact. Stents can be formed in patterns comprising mostly open space, such as lattice works or helical spring patterns. Such patterns require being able to burn through one wall of a tube without burning through the opposite wall.

Laser cutting of a tube proceeds by focusing a laser beam on a targeted spot of the tube. The spot is melted and preferably substantially vaporized by the laser beam. Once the laser beam burns through the wall, the beam strikes the opposite wall within the tube, and can begin to heat the opposite wall from the inside, burning through the opposite wall. This problem is termed "burn through". The melting and vaporization can also leave behind dross, including metal oxides, impurities and fragments of the metal being burned. The dross can fall into the kerf being burned and adhere to the interior of the tube being burned. Both dross adherence and burn through are undesirable. The dross requires removal from the product and burn through can require discarding the product.

One method used to deal with dross adherence and burn through is flushing or sluicing liquid through the tubular workpiece being cut. The fluid is feed in one end of the tube, exiting through both the opposite end of the tube and through the opening burned in the tube wall by the laser. Water is one fluid used. Water within the tube can flush away dross which could be inside or outside of the laser cut opening. The water can also serve to attenuate the laser beam striking the opposite wall. The presence of water within the tube being cut may not completely block the laser beam, allowing the inside wall to be heated. The use of water requires additional equipment for handling the water including supply, catch basins, disposal, and often filtration and reuse. The water must be connected to the tube being cut, which is preferably movable under the laser beam. The tube is preferably rotatable while connected to the water supply. Optimally, the tube can be rapidly mounted in the laser cutting device. The requirement for water complicates the rotation of the tube being cut and can lengthen the time required to mount the tube in the laser cutting device. What is desirable and has not heretofore been provided is a device for preventing burn through and dross accumulation in tubes being cut by laser that does not require the use of a liquid flowing within the tube being cut.

SUMMARY OF THE INVENTION

The present invention includes devices and methods for laser cutting of tube walls while preventing cutting damage to the opposite inside wall surface. One device includes an inner, elongate member formed of metal wire extended through the tube being cut. The wire is preferably moved longitudinally during cutting, thereby presenting a different portion of wire surface to the laser beam during the cutting process, thereby limiting the heating and possible burning of the inner wire. Moving the wire can also serve to remove molten metal and dross adhering to the inner wire before the amount of adherent becomes too large to be pulled through the tube interior. The metal wire, by blocking the tube opposite inside wall from dross and sputtering material, can also serve to protect the opposite wall from having dross or molten metal deposited on it.

One elongate inner member has a circular cross-section. Another elongate inner member is a ribbon, having a rectangular cross-section. The elongate member is preferably formed of metal. Polymeric or other materials may be used in some elongate members. The inner member in one device is a long wire, being supplied from a payoff spool and taken up on a take-up spool. The wire is pulled sufficiently fast during laser cutting of the tube so as to prevent burn through of the wire and unacceptably large build up of dross on the wire within the tube. The wire spools can also be rotating during laser cutting, presenting a spiralling outer wire surface to the laser. The inner member can serve to absorb and conduct laser originated heat away from the point of contact. In some devices, the inner member serves as a sacrificial material, becoming partially destroyed or ablated during the laser cutting process.

Another device utilizes a fluid flowing over the inner elongate member within the tube being cut. The fluid is gaseous in one method and liquid in another method. The fluid can serve to cool the inner member and to cool and carry away molten metal and dross resulting from the laser cutting process.

An alternate method and device utilizes a rod or mandrel as an inner member rather than a wire. The rod or mandrel can have a circular or non-circular shaped cross-section, for example a square or other polygon. The rod can be formed of a material such as metal, polymer or ceramic and can be end mounted to a rod carrier slidably mounted on a table. The rod can be shorter and more compact than the wire and associated spools. The rod may serve to hold stents after cutting for secondary collection. In another alternate device, the rod is slidably and rotatably mounted in a carrier capable of both rotating and moving longitudinally. This device allows the presentation of a spiral path about the rod exterior surface to the cutting laser beam.

DETAILED DESCRIPTION OF THE PREFERRED EMBODIMENTS

Figure 1:
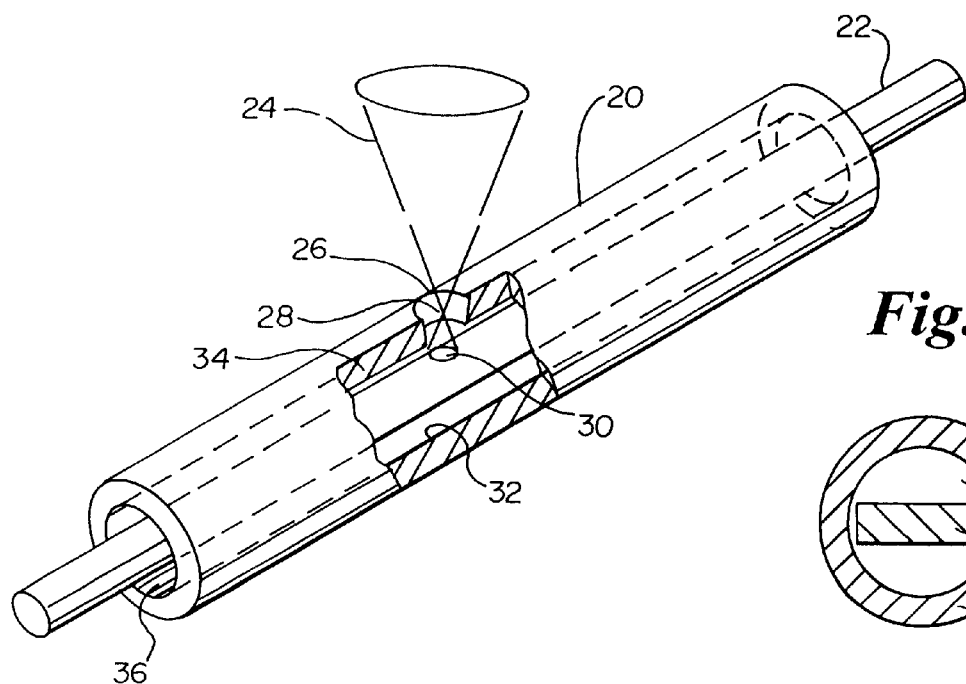
FIG. 1 is a fragmentary perspective view of a tube wall being cut with a laser, having a cut away portion illustrating a wire disposed within the tube.

Referring now to FIG. 1, a tube 20 is illustrated, having an elongate inner member 22 disposed within a tubular lumen 36 and being cut with a laser beam 24. In the embodiment shown, elongate inner member 22 is a metallic wire. Tube 20 includes a wall 34, with laser beam 24 striking or illuminating tube wall 34 at a first location 26 and cutting a hole 28 through wall 34. After burning through tube wall 34, laser beam 24 can be seen to strike inner wire 22 at a location 30, thus preventing the laser beam from striking wall 34 at a second location 32 opposite first location 26. Inner wire 22 preferably has an outside diameter precisely controlled and sized to substantially block lumen 36.

Figure 2:
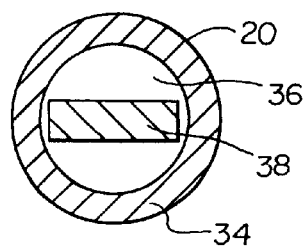
FIG. 2 is a cross-sectional view of an alternate embodiment of the invention, having a ribbon rather than a wire disposed within the tube.

Referring now to FIG. 2, an alternate embodiment elongate inner member is illustrated in a ribbon 38. The elongate inner member can have different shapes, with round wire 22 and rectangular ribbon 38 being illustrated. Other shaped inner members are also within the scope of the invention. The inner elongate member serves to block laser beam 24, thereby preventing "burn through" to the wall opposite the feature or kerf recently cut. The laser cutting process can also cause molten metal to sputter, causing metallic material and dross to be ejected away from hole 28 into lumen 36. Inner wire 22 can pre vent dross from being deposited at opposite wall location 32, with the dross striking inner wire 22. In some embodiments, inner wire 22 is constructed of a material that allows dross to adhere to the wire, while in other embodiments, the inner wire does not allow a substantial amount a dross to adhere, with the dross solidifying in small particles.

Inner wire 22 is preferably moved longitudinally within tube lumen 36 during the cutting process. This can serve to present a different portion of wire 22 to laser beam 24 over time, preventing the overheating, burning, melting and breaking of wire 22 during the cutting process. The movement of wire 22 during laser cutting can also carry away any dross adhering to the wire, before the amount of dross is substantial enough to impair movement of wire 22 within tube 20. In one embodiment, inner wire 22 is also rotated during laser cutting. This also presents a different portion of wire 22 to laser beam 24 over time, such that the portion of wire 22 struck by laser beam 24 describes a helix or spiral about the wire outer surface. Rotating wire 22 during cutting can decrease the length of wire used during cutting.

A preferred material for elongate inner member 22 is a metal such as stainless steel. One embodiment utilizes solid stainless steel wire while another embodiment utilizes hollow stainless steel wire. Elongate inner member 22 can also serve as a sacrificial material, being struck by a laser beam and partially melting or ablating without breaking apart. The longitudinal speed of the inner member will be dependent in part upon the material comprising the inner member. Polymeric materials are contemplated for use in forming inner member 22 such as acetal, phenolic and ultra high molecular weight polyethylene.

A preferred embodiment utilizes inner member 22 to protect the opposite wall of tube 20 without use of any fluid. Another embodiment also utilizes a fluid flowing within tube 20, around inner member 22, during cutting. The fluid can serve to cool the tube being cut, to cool the inner member being struck by the laser beam, and to carry away both tube dross and any sacrificed inner member material. The fluid can be either liquid or gaseous. Preferred gaseous fluids include nitrogen, oxygen, argon, and air. Preferred liquid fluids include water or aqueous based cutting fluids as are common in metal cutting.

A preferred use the invention illustrated in FIG. 1 is the manufacture of stents, such as intravascular stents, which can be formed by cutting patterns from a solid tube, such as a tube of Nitinol or stainless steel. Forming a stent from a tube such as tube 20 can involve the cutting of intricate patterns in the wall of tube 20. This pattern cutting can include the removal of a substantial portion of tube wall 34, such as a series of squares, diamonds and rectangles. The removed shapes can be cut by the movement of tube 20 with respect to laser beam 24. A preferred embodiment holds laser beam 24 perpendicular to the surface of the tube being cut. Another method is to move laser beam 24 longitudinally while moving tube 20 rotationally, thereby cutting the desired pattern in tube wall 34. A preferred method includes holding laser beam 24 fixed rotating and longitudinally moving the tube while holding the beam at right angles to the tube being cut.

Figure 3:
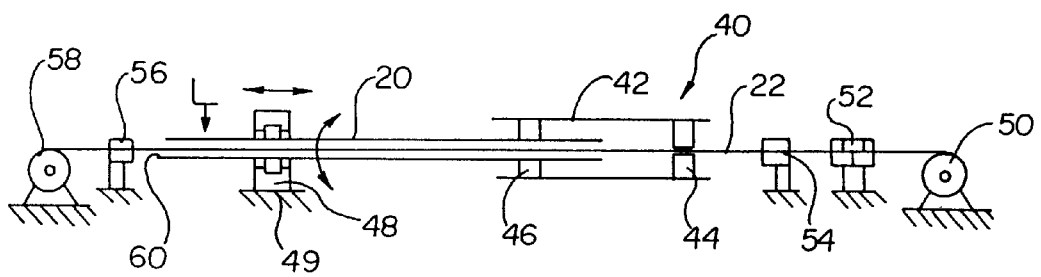
FIG. 3 is a highly diagrammatic side view of a fluidic system for cutting tube holes including payoff spool, wire, wire straightener, wire guide, tube, tube carrier, laser beam source, wire guide, and take-up spool.

Referring now to FIG. 3, a system for cutting tubes with a laser and using internal fluid is illustrated in highly diagrammatic form. The laser cutter is omitted in FIG. 3, its position indicated at "L". Wire 22 is fed by a payoff bobbin or spool 50, straightened by an X–Y, two or more dimensional straightener 52, centered in a two dimensional infeed wire centering device 54, passing through a wire seal 44 into fluid tube 42. Fluid tube 42 can contain a fluid such as water which is feed by a supply line (not shown) and exits at 60. The fluid can serve to cool the wire and carry out dross from the laser cutting. Tube 20, having wire 22 within, is sealed by a tube seal 46, channeling the fluid flow within tube 20. Tube 20 is held by a clamp 48 which is supported by a surface 49, driven (not shown), and capable of moving tube 20 rotationally and translationally. In one embodiment, clamp 48 is driven so as to translate relative to surface 49, with tube 20 fixed relative to clamp 48. In another embodiment, clamp 48 is fixed relative to surface 49, translating tube 20 within clamp 48. Wire 22 continues out tube 20 at 60 along with exiting fluid, continuing through a takeup wire centering device 56 and onto a takeup bobbin or spool 58. Seals 46 and 44 allow tube 20 to rotate and translate while substantially containing a fluid within tube 20 while tube 20 is being cut.

Figure 4:
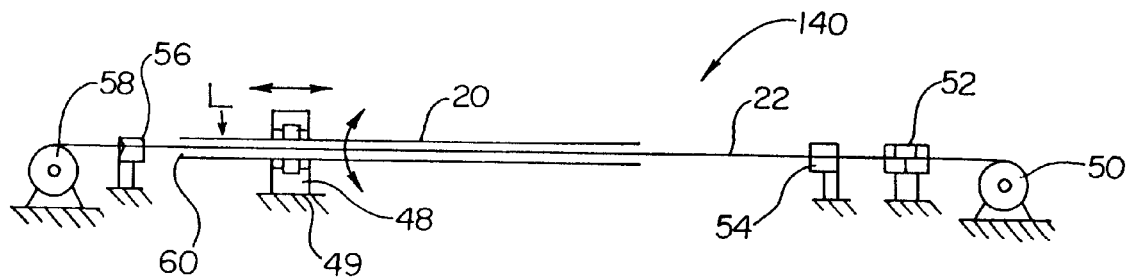
FIG. 4 is a highly diagrammatic side view of a non-fluidic system for cutting tube holes including payoff spool, wire, wire straightener, wire guide, tube, tube carrier, laser beam source, wire guide, and take-up spool.

Referring now to FIG. 4, an alternate embodiment tube cutting system 140 is illustrated. System 140 is similar in many respects to tube cutting system 40. System 140 does not utilize a liquid fluid to carry away dross. Tube cutting system 140 instead relies in part on wire 22 to carry away any dross adhering to the wire. Tube 20 can of course be supported at more than one surface, such as surface 49.

Figure 5:
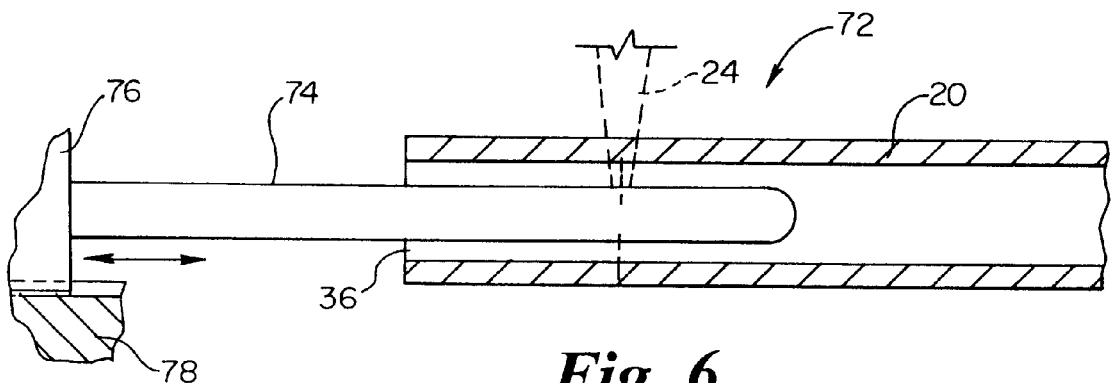
FIG. 5 is a fragmentary, side, cross-sectional view of an alternate embodiment of the invention having a translatable rod as the elongate inner member.
Figure 6:
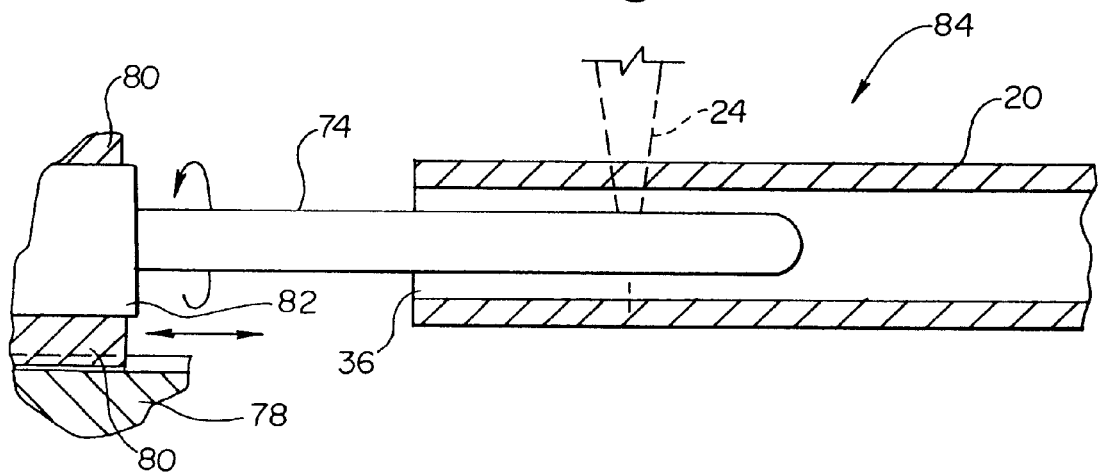
FIG. 6 is a fragmentary, side, cross-sectional view of an alternate embodiment of the invention having a translatable and rotatable rod as the elongate inner member.

Referring now to FIG. 5, an alternate embodiment tube cutting system 72 is illustrated, having a rod or mandrel 74 in place of a wire. Rod 74 is movable longitudinally by a rod carrier 76 which can slide on table 78. In one method, cutting begins with rod 74 fully inserted within tube 20, being withdrawn as the cutting proceeds. Rod 74 can be sized to be replaced one to one with tube 20 once tube 20 is fully cut. Rod 74 can also be sized to last for multiple tubes, being replaced as needed. In embodiments where dross is handled by being ejected with a fluid, rod 74 may be used for longer periods, provided the rod does not melt or become contaminated. FIG. 6 illustrates yet another embodiment tube cutting system 84 having a tube carrier clamp 82 rotatably holding rod 74 within. Clamp 82 is held within a longitudinally slidable clamp mount 80 which rides on table 78. Both rotatable tube carrier 82 and slidable mount 80 are motor driven. Tube cutting systems 72 and 84 allow use of more compact rods and rod handling chucks instead of long wires and wire handling systems.

Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A system for cutting through a tube wall into a tube lumen without marking an opposite tube wall comprising:

a first wire centering device in coaxial alignment with the tube lumen, and disposed proximate a first end thereof;

a second wire centering device in coaxial alignment with the tube lumen, and disposed proximate a second end thereof;

an elongate wire extending from a first spool to a second spool, and passing through the first wire centering device, the tube lumen, and the second wire centering device;

a laser beam source capable of illuminating a portion of the tube wall and capable of burning through the tube wall; and means for rotating the elongate wire within the tube.

2. A system for cutting through a tube wall as recited in claim 1, further comprising means for axially moving the elongate wire relative to the tube, such that a differing portion of the elongate wire can be illuminated by the laser beam source over time during the laser cutting.

3. A system for cutting through a tube wall as recited in claim 2, wherein the means for axially moving the elongate wire relative to the tube comprises means for rotating at least one of the spools.

4. A system for cutting through a tube wall as recited in claim 3, wherein the means for rotating at least one of the spools comprises a motor.

5. A system for cutting through a tube wall as recited in claim 1, wherein the elongate wire includes metal.

6. A system for cutting through a tube wall as recited in claim 1, wherein the elongate wire includes stainless steel.

7. A system for cutting through a tube wall into a tube lumen without marking an opposite tube wall comprising:

a first wire centering device capable of centering a wire in two planes;

a second wire centering device capable of centering a wire in two planes;

the first and second wire centering devices being disposed at opposite ends of the tube and in coaxial alignment with the tube lumen;

an elongate wire adapted to be received in the tube lumen extending from a first spool to a second spool, and passing through the first wire centering device, the tube lumen, and the second wire centering device;

a laser beam source capable of illuminating a portion of the tube wall and capable of burning through the tube wall; and means for rotating the elongate wire within the tube.

8. A system for cutting through a tube wall as recited in claim 7, further comprising means for axially moving the elongate wire relative to the tube, such that a differing portion of the elongate wire can be illuminated by the laser beam source over time during the laser cutting.

9. A system for cutting through a tube wall as recited in claim 8, wherein the means for axially moving the elongate wire relative to the tube comprises means for rotating at least one of the spools.

10. A system for cutting through a tube wall as recited in claim 9, wherein the means for rotating at least one of the spools comprises a motor.

11. A system for cutting through a tube wall as recited in claim 7, wherein the elongate wire includes metal.

12. A system for cutting through a tube wall as recited in claim 7, wherein the elongate wire includes stainless steel.

13. A system for cutting through a tube wall into a tube lumen without marking an opposite tube wall comprising:

a first wire centering device capable of centering a wire in two planes;

a second wire centering device capable of centering a wire in two planes;

the first and second wire centering devices being disposed at opposite ends of the tube and in coaxial alignment with the tube lumen;

an elongate wire adapted to be received in the tube lumen extending from a first spool to a second spool;

a wire straightening device disposed between the first spool and the first wire centering device;

the wire passing through the wire straightening device, the first wire centering device, the tube lumen, and the second wire centering device; and a laser beam source capable of illuminating a portion of the tube wall and capable of burning through the tube wall.

14. A system for cutting through a tube wall as recited in claim 13, further comprising means for axially moving the elongate wire relative to the tube, such that a differing portion of the elongate wire can be illuminated by the laser beam source over time during the laser cutting.

15. A system for cutting through a tube wall as recited in claim 14, wherein the means for axially moving the elongate wire relative to the tube comprises means for rotating at least one of the spools.

16. A system for cutting through a tube wall as recited in claim 15, wherein the means for rotating at least one of the spools comprises a motor.

17. A system for cutting through a tube wall as recited in claim 13, wherein the elongate wire includes metal.

18. A system for cutting through a tube wall as recited in claim 13, wherein the elongate wire includes stainless steel.

* * * * *